US008625033B1

(12) United States Patent
Marwood et al.

(10) Patent No.: US 8,625,033 B1
(45) Date of Patent: Jan. 7, 2014

(54) LARGE-SCALE MATCHING OF AUDIO AND VIDEO

(75) Inventors: David Marwood, San Leandro, CA (US); Daniel Keysers, Adliswil (CH); Richard Tucker, Zurich (CH); Gheorghe Postelnicu, Zurich (CH); Michele Covell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 922 days.

(21) Appl. No.: 12/697,880

(22) Filed: Feb. 1, 2010

(51) Int. Cl.
*H04N 5/14* (2006.01)

(52) U.S. Cl.
USPC ............ 348/701; 348/700; 382/181; 382/224

(58) Field of Classification Search
USPC ............................ 348/700, 701; 382/224, 181
See application file for complete search history.

(56) References Cited

U.S. PATENT DOCUMENTS

| | | | |
|---|---|---|---|
| 4,811,399 A | 3/1989 | Landell et al. | |
| 6,236,758 B1 | 5/2001 | Sodagar et al. | |
| 6,585,521 B1 | 7/2003 | Obrador | |
| 6,766,523 B2 | 7/2004 | Herley | |
| 6,782,186 B1 | 8/2004 | Covell et al. | |
| 6,944,632 B2 | 9/2005 | Stern | |
| 7,043,473 B1 | 5/2006 | Rassool et al. | |
| 7,174,293 B2 | 2/2007 | Kenyon et al. | |
| 7,386,479 B2 | 6/2008 | Mizuno | |
| 8,069,176 B1 * | 11/2011 | Ioffe et al. .................. | 707/747 |
| 8,184,953 B1 * | 5/2012 | Covell et al. ................ | 386/248 |
| 8,238,669 B2 * | 8/2012 | Covell et al. ................ | 382/224 |
| 2002/0133499 A1 | 9/2002 | Ward et al. | |
| 2003/0033223 A1 | 2/2003 | Mizuno | |
| 2003/0093790 A1 | 5/2003 | Logan et al. | |
| 2004/0025174 A1 | 2/2004 | Cerrato | |
| 2004/0031058 A1 | 2/2004 | Reisman | |
| 2004/0128682 A1 | 7/2004 | Liga et al. | |
| 2004/0199387 A1 | 10/2004 | Wang et al. | |
| 2005/0086682 A1 | 4/2005 | Burges et al. | |
| 2005/0096920 A1 | 5/2005 | Matz et al. | |
| 2005/0147256 A1 | 7/2005 | Peters et al. | |
| 2005/0193016 A1 | 9/2005 | Seet et al. | |
| 2005/0283792 A1 | 12/2005 | Swix et al. | |
| 2006/0080356 A1 | 4/2006 | Burges et al. | |
| 2007/0124756 A1 | 5/2007 | Covell et al. | |
| 2007/0130580 A1 | 6/2007 | Covell et al. | |
| 2007/0143778 A1 | 6/2007 | Covell et al. | |
| 2008/0090551 A1 | 4/2008 | Gidron et al. | |
| 2008/0263041 A1 | 10/2008 | Cheung | |

OTHER PUBLICATIONS

U.S. Appl. No. 11/765,292, filed Jun. 19, 2007, 39 pages.
U.S. Appl. No. 12/042,138, filed Mar. 4, 2008, 38 pages.

(Continued)

*Primary Examiner* — Geepy Pe
(74) *Attorney, Agent, or Firm* — Fenwick & West LLP

(57) ABSTRACT

Large-scale matching of videos is performed by matching a set of probe videos against a set of reference videos to determine if they are visually and/or aurally similar. The visual and audio fingerprints of all probe videos and reference videos are divided into subfingerprints, which are divided into LSH bands. The LSH bands of the probe videos are sorted in one list, and the LSH bands of the reference videos are sorted in another list. Then, the two sorted lists are linearly scanned for matching LSH bands. The matching LSH bands are sorted by probe video ID, and each probe video ID is searched to find matches between probe videos and reference videos. Further, an incremental matching process identifies matches as groups of new probe videos and/or new reference videos are added, without unnecessary repetition of matching old probe videos against old reference videos.

31 Claims, 6 Drawing Sheets

(56) References Cited

OTHER PUBLICATIONS

U.S. Appl. No. 12/237,397, filed Sep. 25, 2008, 34 pages.
U.S. Appl. No. 12/536,907, filed Aug. 6, 2009, 51 pages.
U.S. Appl. No. 12/569,827, filed Sep. 29, 2009, 56 pages.
U.S. Appl. No. 11/468,265, filed Aug. 29, 2006, Covell et al.
U.S. Appl. No. 11/766,594, filed Jun. 21, 2007, Baluja et al.
Baluja, S., et al., "Content Fingerprinting Using Wavelets," 3rd European Conference on Visual Media Production (CVMP 2006), Part of the 2nd Multimedia Conference, 2006, 10 pages.
Baluja, S., et al., "Learning "Forgiving" Hash Functions: Algorithms and Large Scale Tests," Proc. Int. Joint Conf. Artif. Intell, 2007, pp. 2663-2669.
Baluja, S., et al., "Waveprint: Efficient wavelet-based audio fingerprinting," Pattern Recognition, 2008, 3 pages.
Burges, C., et al., "Duplicate Detection and Audio Thumbnails with Audio Fingerprinting" Technical Report MSR-TR-2004-19, Microsoft Corporation, 2004, 5 pages [online] [retrieved on Nov. 21, 2006] Retrieved from the internet: <URL: www.research.microsoft.com/~cburges/tech_reports/tr-2004-19.pdf>.
Burges, C., et al., "Using Audio Fingerprinting for Duplicate Detection and Thumbnail Generation," Microsoft Research, Microsoft Corporation, Mar. 2005, 4 pages.
Cano, P., et al., "A Review of Algorithms for Audio Fingerprinting" In Proc. of the IEEE MMSP, St. Thomas, Virgin Islands, 2002, 5 pages, [online] [retrieved on Nov. 21, 2006] Retrieved from the Internet: <URL: www.iua.upf.es/mtg/publications/MMSP-2002-pcano.pdf>.
Cohen et al., "Finding Interesting Associations without Support Pruning," IEEE Transactions on Knowledge and Data Engineering, 2001, 12 pages, can be retrieved from the internet: <URL: www.dbis.informatik.huberlin.de/dbisold/lehre/WS0405/kDD/paper/CDFG_00.pdf>.
Covell, M., et al., "Advertisement Detection and Replacement using Acoustic and Visual Repetition," IEEE 8$^{th}$ Workshop on Multimedia Signal Processing, Oct. 2006, 6 pages.
Covell, M., et al., "LSH Banding for Large-Scale Retrieval With Memory and Recall Constraints," International Conference on Acoustics, Speech and Signal Processing (ICASSP-2009), 4 pages.
Dean, J., et al., "MapReduce: Simplified Data Processing on Large Clusters," OSDI'04: Sixth Symposium on Operating System Design and Implementation, San Francisco, CA, Dec. 2004, 13 pages.
Haitsma, J., et al., "A Highly Robust Audio Fingerprinting System" IRCAM, 2002, 9 pages, [online] [retrieved on Nov. 16, 2006], Retrieved from the Internet: <URL: www.ismir2002.ismir.net/proceedings/02-FP04-2.pdf>.
Jacobs et al., "Fast Multiresolution Image Querying" International Conference on Computer Graphics and Interactive Techniques, ACM, 1995, 10 pages, [online] [retrieved on Nov. 21, 2006]. Retrieved from the Internet: <URL: www.grail.cs.washington.edu/projects/query/mrquery.pdf>.
Ke et al., "Computer Vision for Music Identification" IEEE Computer Society Conference on Computer Vision and Pattern Recognition, 2005, 8 pages, [online] [retrieved on Nov. 21, 2006], Retrieved from the Internet: <URL: www.cs.cmu.edu/~yke/musicretrieval/cvpr2005-mr.pdf>.
Sadlier et al., "Automatic TV Advertisement Detection from MPEG Bitstream," 2001, Pattern Recognition, vol. 35, Issue 12, pp. 2719-2726.
Stollnitz et al., "Wavelets for Computer Graphics: A Primer, Part 1," University of Washington, 1995, 8 pages, [online] [retrieved on Nov. 21, 2006]. Retrieved from the Internet: <URL: www.grail.cs.washington.edu/pub/stoll/wavelet1.pdf>.
Stollnitz et al., "Wavelets for Computer Graphics: A Primer, Part 2," University of Washington, 1995, 9 pages, [online] [retrieved on Nov. 21, 2006]. Retrieved from the Internet: <URL: www.grail.cs.washington.edu/pub/stoll/wavelet2.pdf>.
Viola et al., "Robust Real-Time Object Detection," Int. J. Computer Vision, 2002, 25 pages.
Wang, "The Shazam Music Recognition Service," *Communications of the ACM*, Aug. 2006, 49(8): 5 pages.
Yang, C. "MACS: Music Audio Characteristic Sequence Indexing for Similarity Retrieval", Oct. 2001, pp. 21-24, New Paltz, New York.
"Community" definition, Oxford English Dictionary, 17 pages, [online] [retrieved on Apr. 27, 2009] Retrieved from the internet <URL:http://dictionary.oed.com/cgi/entry/50045241?single=1&query_type=word&queryword=community>.
"Compression" definition, Oxford English Dictionary, 4 pages, [online] [retrieved on Apr. 27, 2009] Retrieved from the internet <URL:http://dictionary.oed.com/cgi/entry/50045890?single=1&query_type=word&queryword=compression>.
"Database" definition, Oxford English Dictionary, 2 pages, [online] [retrieved on Apr. 27, 2009] Retrieved from the internet <URL:http://dictionary.oed.com/cgi/entry/50057772?single=1&query_type=word&queryword=database>.
"Encrypt" definition, Oxford English Dictionary, 1 page, [online] [retrieved on Apr. 27, 2009] Retrieved from the internet <URL:http://dictionary.oed.com/cgi/entry/00292459?single=1&query_type=word&queryword=encrypt>.
"Shazam Experience Music" SHAZAM Entertainment, 2002-2007, 2 pages, [online] [Retrieved on May 30, 2007]. Retrieved from the Internet: <URL: www.shazam.com/music/portal/sp/s/media-type/html/user/anon/page/default/template/Myhome/music.html>.
"Shazam Entertainment Brings Music Recognition to Windows Mobile 5.0 Powered Smartphones," Shazam Entertainment, Apr. 6, 2006, 1 page, [online][retrieved on Nov. 16, 2006). Retrieved from the Internet: <URL: www..shazam.com/music/portal/sp/s/media-type/html/user/anon/page/default/template/pages/p/company_release30.html>.
"CS276 Information Retrieval and Web Mining," STANFORD, 2005, 8 pages, [online] [retrieved on Nov. 16, 2006]. Retrieved from the Internet: <URL: www.stanford.edu/class/cs276/handouts/lecture19.pdf>.
"Data Mining: Associations," STANFORD, 2002, 11 pages, [online] [retrieved on Nov. 16, 2006]. Retrieved from the Internet: <URL: www.stanford.edu/class/cs206/cs206-2.pdf>.
International Preliminary Report on Patentability, Application No. PCT/US06/45549 mailed Jun. 12, 2008, 7 pages.
European Search Report, EP Application No. 08 15 3719 mailed Sep. 26, 2008, 8 pages.
International Preliminary Report on Patentability, Application No. PCT/US06/45551 mailed Apr. 2, 2009, 11 pages.
PCT International Search Report for PCT/US2006/045549 dated Oct. 9, 2007, 10 pages.
PCT International Search Report for PCT/US2006/045551 dated Jul. 21, 2008, 20 pages.

\* cited by examiner

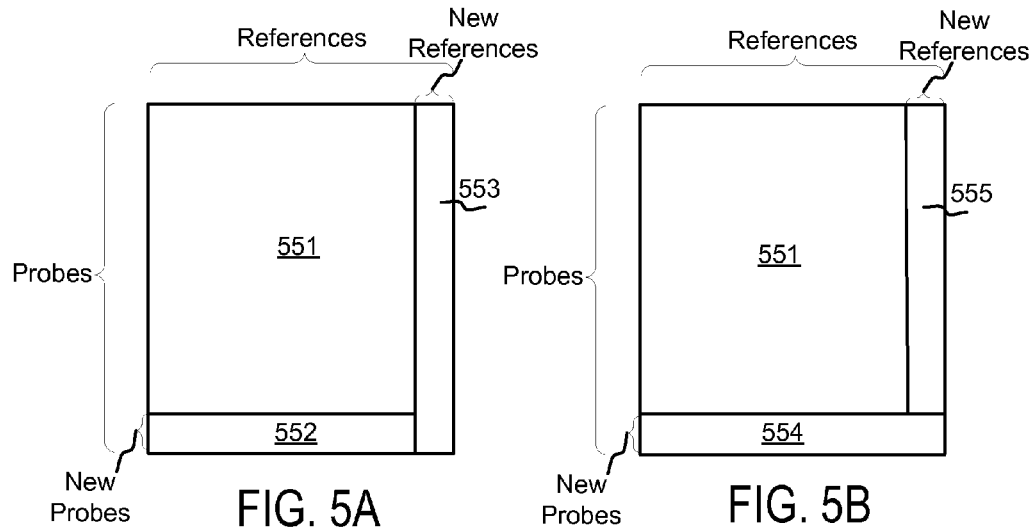
FIG. 5A
FIG. 5B
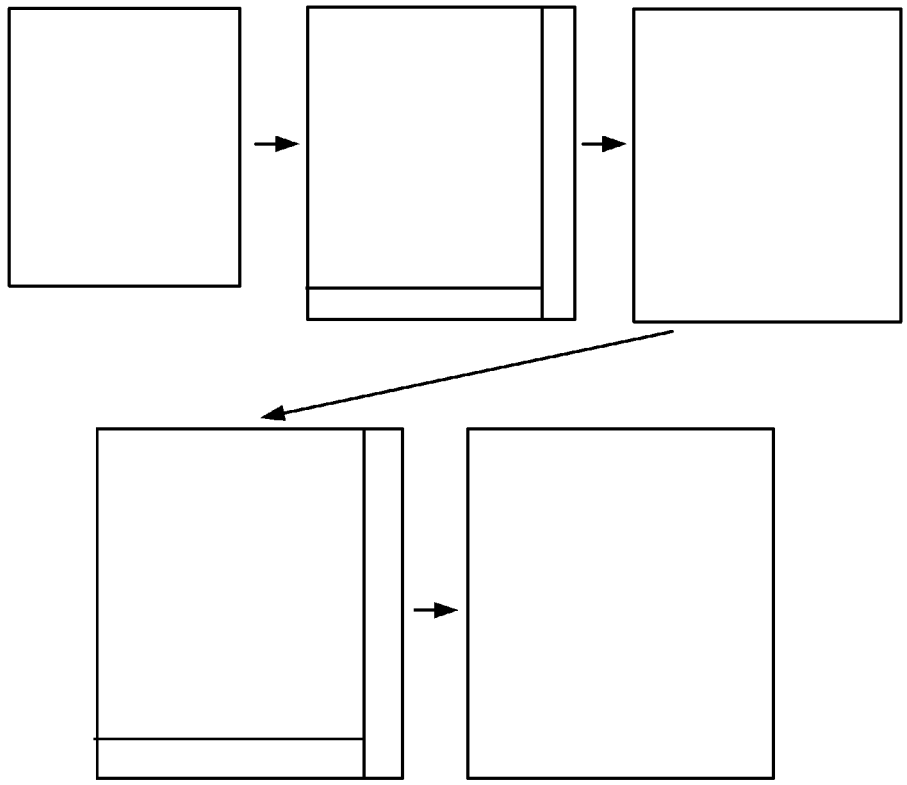
FIG. 5C

LARGE-SCALE MATCHING OF AUDIO AND VIDEO

BACKGROUND

1. Field of the Invention

This invention generally relates to matching audio and video files against a set of reference audio and video files.

2. Description of the Related Art

The sharing of video content on websites has developed into a worldwide phenomenon. On average, over 10,000 videos are posted to video sharing websites every day, and this number is increasing as the tools and opportunities for capturing video become easy to use and more widespread.

It is desirable to identify audio and video files that are aurally or visually similar to other audio or video files in a collection. These audio or video file matches may be used to improve search results of users searching for particular content on the video sharing website, they may be used to recommend additional audio or video files that are similar to a file a user has already played, or they may be used to identify duplicates or near duplicates of content to content rights holders.

SUMMARY

Embodiments of the invention include methods, computer-readable storage media, and computer systems for performing large-scale matching of audio and video files to other audio and video files from a collection. A probe set of videos is matched against a reference set of videos by determining if they are either visually or aurally similar. The visual and audio fingerprints of all probe videos and reference videos are divided into subfingerprints, which are themselves divided into Locality Sensitive Hashing ("LSH") bands. The LSH bands of the probe videos are sorted into a list. The LSH bands of the reference videos are sorted into a second list. Then, the two sorted lists are linearly scanned for matching LSH bands between the probe videos and the reference videos. Matching LSH bands are then sorted by probe video IDs. Each probe video ID is searched for reference videos containing many matching LSH bands grouped by offset. The matches are stored for use in improving search results, identifying similar content, and identifying duplicates or near duplicates of content to rights holders.

In another embodiment, an incremental process is used to identify matches as groups of new probe videos and/or new reference videos are added to the existing collection. All new probe videos are matched against all old reference videos. All (new and old) probe videos are matched against all new reference videos. Then, the identified matches from these two steps are added to the results of the previous full collection matching process (all old probe videos against all old reference videos) to identify the complete set of matches for all probe videos and all reference videos. Thus, the set of probe videos and reference videos can be iteratively built up without unnecessary and costly repetitive matching of old probe videos against old reference videos.

BRIEF DESCRIPTION OF THE DRAWINGS

FIGS. 5A-5B illustrate two options for dividing the tasks of matching probe videos and reference videos into batches for incremental matching. FIG. 5C is a series of frames illustrating how a collection of probe videos and reference videos can grow incrementally by scanning batches of the new probe videos against the old reference videos and matching all (new and old) probe videos against all new reference videos.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Video sharing websites may desire to match a first set of videos against a second set of videos for a variety of purposes. For example, matches may be used to improve search results of users searching for particular content on the video sharing website because they may be used to remove duplicates or near duplicates from the search results, they may be used to recommend additional audio or video files that are similar to a file a user has already selected or played, or they may be used to identify duplicates or near duplicates of content.

For purposes of description, the first set of videos will be referred to herein as "probe videos" and the second set of videos will be referred to herein as "reference videos." Probe videos are, for example, a set of user-generated content uploaded to a video sharing website, and reference videos are a set of videos against which the probe videos are matched.

Figure 1A:
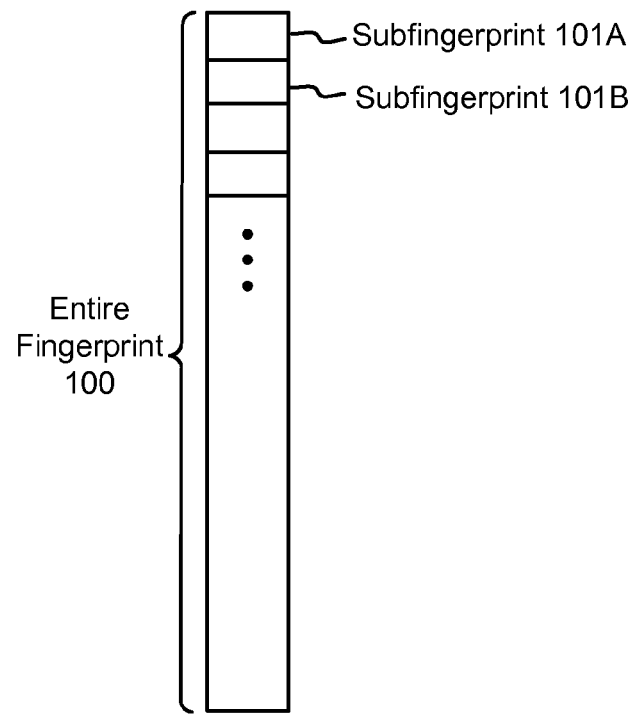
FIG. 1A is a conceptual illustration of a video fingerprint divided into subfingerprints for storage in memory of a computer system.
Figure 1B:
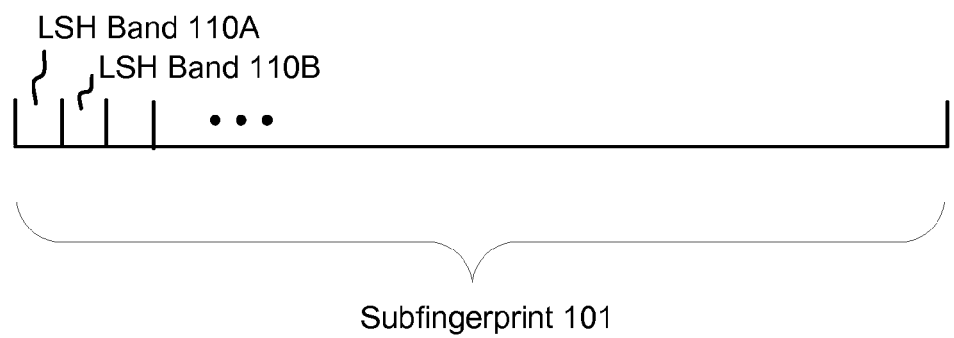
FIG. 1B is a conceptual illustration of a subfingerprint divided into LSH bands for storage in memory of a computer system.

FIGS. 1A and 1B illustrate the pre-processing steps by which probe videos and reference videos are prepared in order to begin the matching process. FIG. 1A is an illustration of a video fingerprint 100 divided into subfingerprints 101A, 101B. In one embodiment, an entire fingerprint 100 is determined for each probe video and for each reference video according to any of various techniques known to those of skill in the art, for example by applying a hash-based fingerprint function to a bit sequence of the video file. Additional examples of audio fingerprinting are discussed in S. Baluja, M. Covell, "Waveprint: Efficient wavelet-based audio fingerprinting," Pattern Recognition, 2008, which is incorporated herein by reference. The entire fingerprint 100 may be determined separately for the audio portion of the video and the visual portion of the video, and matches may be separately determined for audio and video. In one embodiment, the subfingerprints 101A, 101B each represent about a quarter second of the original video, wherein each quarter second comprises approximately 100 bytes of data.

FIG. 1B is an illustration of a subfingerprint divided into LSH bands 110A, 110B. Locality Sensitive Hashing (LSH) is commonly used technique to divide subfingerprints 101 into manageable portions for matching purposes. In one embodiment, each LSH band 110A, 110B, etc., comprises 4 bytes from the 100 bytes of data in the subfingerprint 101. In one embodiment, implicit in each LSH band is the time when it occurs within the video, referred to herein as the "time offset" as measured from the beginning of the video. In one implementation, the LSH band is represented by a numerical value, but other representations of LSH values can also be used, provided that the representation allows sorting. Further details regarding LSH banding can be found in M. Covell and S. Baluja, "LSH Banding For Large-Scale Retrieval With Memory and Recall Constraints," *International Conference on Acoustics, Speech and Signal Processing (ICASSP*-2009), which is incorporated herein by reference.

1. System Overview

Figure 2:
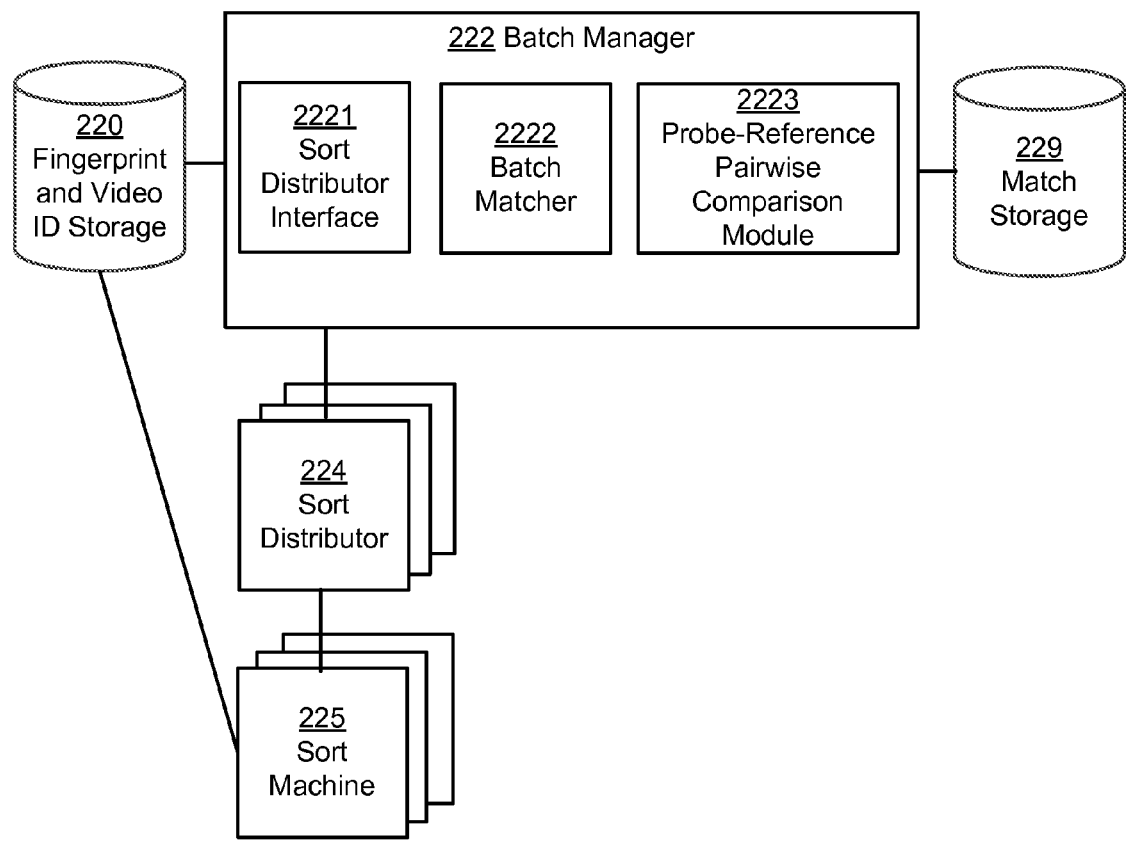
FIG. 2 is a high-level block diagram of a computing environment according to one embodiment.

FIG. 2 is a high-level block diagram of a computing environment 200 according to one embodiment of the system for performing large-scale matching of audio and video. The computing environment 200 includes fingerprint and video ID storage 220, a batch manager 222, at least one sort distributor 224 controlling at least one sort machine 225, and match storage 229.

The fingerprint and video ID storage 220 is a storage location for the fingerprints 100, subfingerprints 101, and LSH bands 110A, 110B of all probe and reference videos. Each fingerprint 100, subfingerprint 101, and LSH band 110A, 110B are keyed to a unique identifier for the particular video from which it was generated. These unique identifiers are referred to herein as video IDs. The video IDs are also stored in storage 220.

The batch manager 222 manages the batches of a set of probe videos to be matched against a set of reference videos. The batch manager receives the LSH bands of all probe and reference videos to be matched from fingerprint and video ID storage 220. Through communications with the sort distributor 224, the batch manager processes the batches of probe videos to be matched against reference videos and outputs the matches. The batch manager includes a sort distributor interface 2221, a batch matcher 2222, and a probe-reference pairwise comparison module 2223.

The sort distributor interface 2221 manages the communications between the batch manager 222 and at least one sort distributor 224. The batch manager 222 uses the sort distributor interface 2221 to instruct the sort distributor 224 to sort the LSH bands of all probe videos and, separately, the LSH bands of all reference videos, which will be described in greater detail below.

One or more sort distributors 224 receive the LSH bands of all probe and reference videos that will be compared in the batch by the batch manager 222. Each sort distributor 224 executes a sorting function over one or more computers, referred to herein as sort machines 225, to process a large dataset. Examples of distributed sorters include MapReduce, developed by Google Inc., and Hadoop, developed as an open-source Apache product. An example implementation of MapReduce is presented in J. Dean and S. Ghemawat, "MapReduce: Simplified Data Processing on Large Clusters," OSDI'04: Sixth Symposium on Operating System Design and Implementation, San Francisco, Calif., December, 2004, which is incorporated herein by reference. In one implementation, a first sort distributor 224 instructs a first group of sort machines 225 to sort the LSH bands of all probe videos in the batch, and a second sort distributor 224 instructs a second group of sort machines 225 to sort the LSH bands of all reference videos in the batch. In one embodiment, each sort distributor 224 distributes the sorting tasks across multiple sort machines 225 that are working in parallel. Thus, a sort distributor 224 can more quickly obtain the sorted list of LSH bands, for example from all probe videos in the batch or from all reference videos in the batch. The one or more sort distributors 224 returns the sorted lists of LSH bands from all probe videos in the batch and the sorted lists of LSH bands from all reference videos in the batch to the batch manager 222 though the sort distributor interface 2221.

Referring back to the batch manager 222, the batch manager also includes a batch matcher 2222. The batch matcher 2222 instructs the sort distributor 224 and the sort machines 225 to perform a linear scan of the sorted LSH bands to identify LSH bands that appear both in a probe video and a reference video and output each probe video ID along with the associated reference LSH bands and video IDs. The sort distributor 224 and sort machines 225 sort this output by probe video ID, which produces, for each probe video ID, all reference video IDs, LSH bands, and offsets that match it.

The probe-reference pairwise comparison module 2223 reviews the results of the common LSH bands found by the batch matcher 2222 for each pair of probe and reference videos found to share LSH bands to determine whether a probe video matches a reference video. In one embodiment, a threshold of approximately 50 matches of LSH bands are used to determine that a probe video matches a reference video. A match is stronger if the matching LSB hands are clumped in subfingerprints and if they are clumped by offset. A probe video may be determined to match more than one reference video. For example, the first portion of a probe video may be similar to a first reference video, and a second portion of the probe video may be similar to a second reference video. In implementations where the audio portion of a video is analyzed for matches separately from a visual portion of a video, the audio portion of a probe video may match a first reference video and the visual portion of a video may match a second reference video. In one implementation, if a match is determined in an audio segment, greater leniency may be applied by the probe-reference pairwise comparison module 2223 toward finding a video match to the same reference video for borderline cases. The results of the pairwise comparison are output to match storage 229.

The match storage 229 stores the matches for any probe. Specifically, for any probe, the match storage 229 stores the reference videos and the time offset ranges over which the probe video matches the reference videos in audio, video, or both for use in any of the applications described below.

Figure 3:
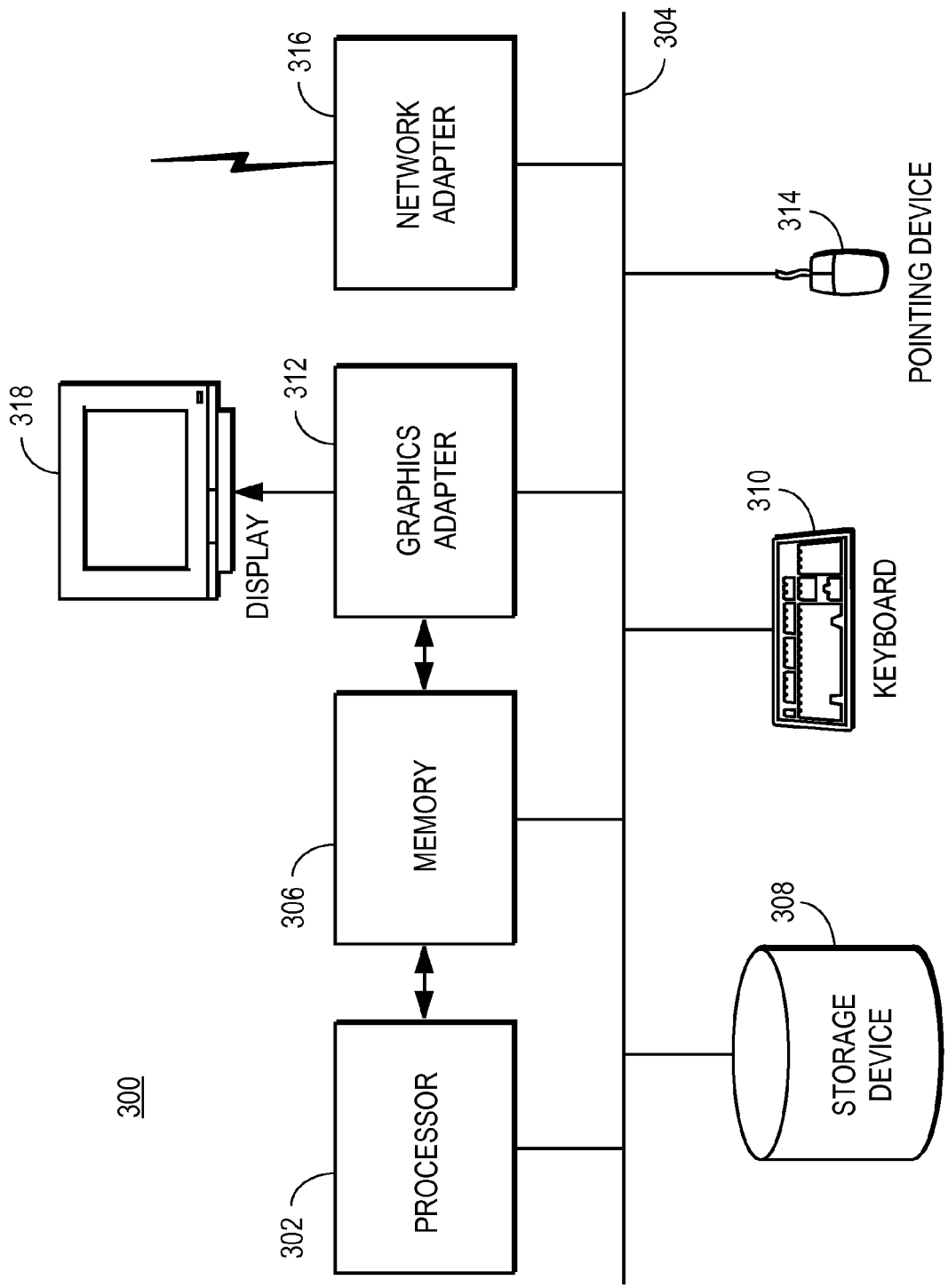
FIG. 3 is a high-level block diagram illustrating an example of a computer for use as a batch manager, a sort distributor, and/or a sort machine of FIG. 2.

FIG. 3 is a high-level block diagram illustrating an example of a computer for use as a batch manager 222, a sort distributor 224, and/or a sort machine 225 of FIG. 2. Illustrated are a processor 302 coupled to a bus 304. Also coupled to the bus 304 are a memory 306, a storage device 308, a keyboard 310, a graphics adapter 312, a pointing device 314, and a network adapter 316. A display 318 is coupled to the graphics adapter 312.

The processor 302 may be any general-purpose processor. The storage device 308 is, in one embodiment, a hard disk drive but can also be any other device capable of storing data, such as a writeable compact disk (CD) or DVD, or a solid-state memory device. The memory 306 may be, for example, firmware, read-only memory (ROM), non-volatile random access memory (NVRAM), and/or RAM, and holds instructions and data used by the processor 302. The pointing device 314 may be a mouse, track ball, or other type of pointing device, and is used in combination with the keyboard 310 to input data into the computer 300. The graphics adapter 312 displays images and other information on the display 318. The network adapter 316 couples the computer 300 to the network (not shown). In one embodiment, the network is the Internet. The network can also utilize dedicated or private communications links that are not necessarily part of the Internet.

As is known in the art, the computer 300 is adapted to execute computer program modules. As used herein, the term "module" refers to computer program logic and/or data for providing the specified functionality. A module can be implemented in hardware, firmware, and/or software. In one embodiment, the modules are stored on the storage device 308, loaded into the memory 306, and executed by the processor 302. The computer 300 is configured to perform the specific functions and operations by various modules, for example as detailed in FIGS. 4 and 6, and thereby operates as a particular computer under such program control. The types of computers 300 utilized by the entities of FIG. 2 can vary depending upon the embodiment and the processing power utilized by the entity.

2. Full Collection Matching

Figure 4:
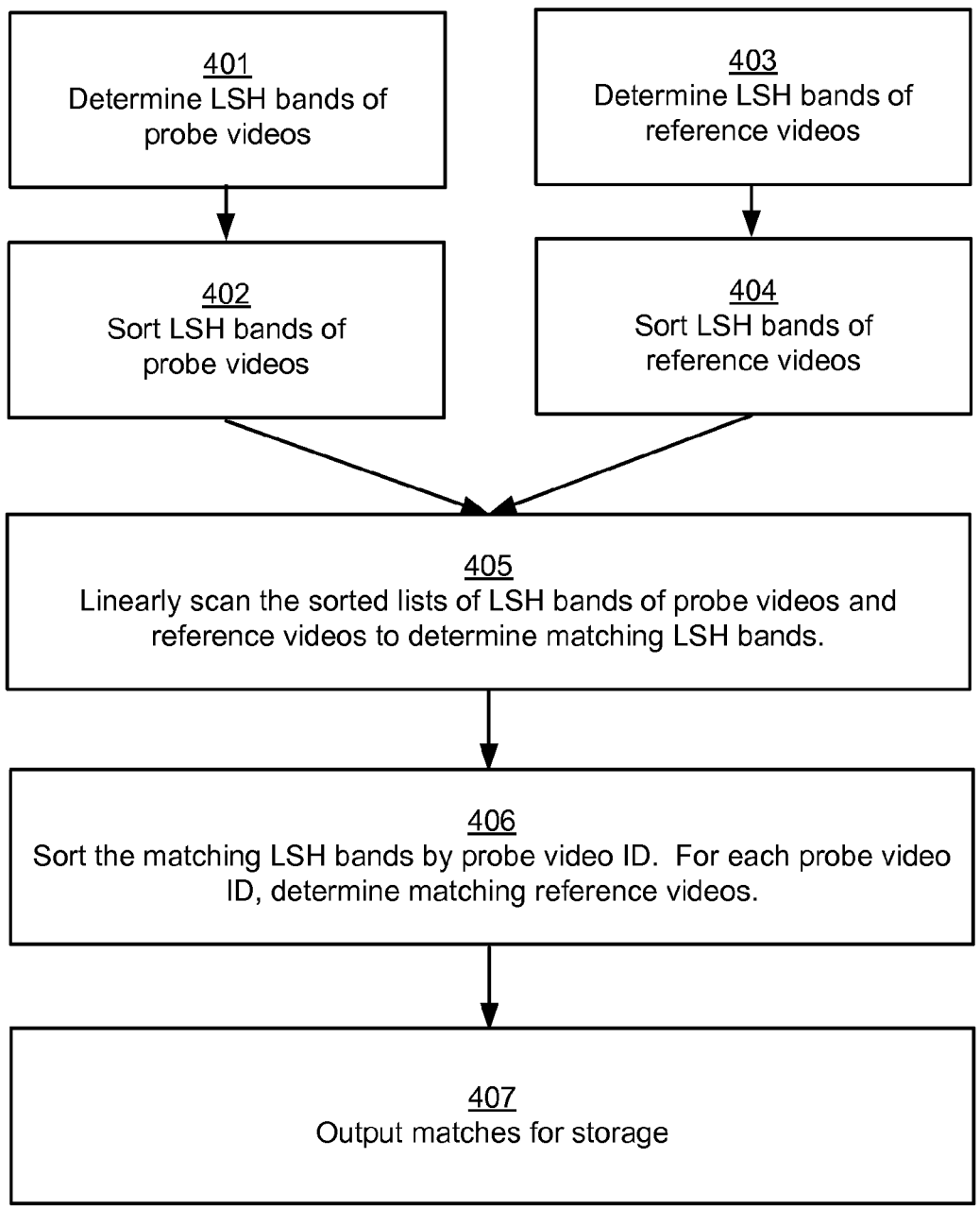
FIG. 4 is an example method of performing a batch match of probe videos against reference videos according to one embodiment.

FIG. 4 is an example method 400 of performing a batch match of probe videos against reference videos according to one embodiment. In one implementation, the method 400 is used to conduct a full collection scan for matches of a large collection of probe videos against a large collection of reference videos. The example below illustrates the method 400 by finding visual matches between videos, however matches can be found between aurally similar videos by executing the method 400, for example, in parallel, to match audio.

In 401, the LSH bands of the probe videos are determined. In a pre-processing step, Locality Sensitive Hashing is used to determine a value corresponding to each small portion of the probe video. The LSH bands of the probe videos may be stored in fingerprint and video ID storage 220 so as to avoid the unnecessary repetition of this pre-processing step. Then, the LSH bands corresponding to the probe videos are obtained from fingerprint and video ID storage 220. In 402, the LSH bands of the probe videos are sorted by the LSH band value using a distributed sort, for example, as executed by a sort distributor 224.

Similarly, in 403, the LSH bands of the reference videos are determined. The LSH bands of the reference videos may also be stored in and thereafter obtained from fingerprint and video ID storage 220. In 404, the LSH bands of the probe videos are sorted by LSH band value using a distributed sort, for example, as executed by the same or another sort distributor 224. In some implementations, steps 401 and 402 execute at an overlapping time with steps 403 and 404.

In 405, a linear scan is made of the sorted lists of LSH bands of the probe videos and reference videos for matches, for example by batch matcher 2222 of the batch manager 222. Because the LSH bands are sorted, a linear scan can be made much more quickly than executing single lookups of LSH bands from probe videos across all the LSH bands of reference videos. Another advantage is that each matched LSH band can associate many probe video IDs with many reference video IDs, thus avoiding duplicating work. Thus, although the investment to sort the LSH bands in steps 402 and 404 is significant, the sorting ultimately accelerates the process of determining matches in 405.

In 406, the matching LSH bands are sorted by probe video ID. For each probe video ID, the matching reference videos can be determined. Accordingly, in 407, the matches can be output by the batch manager 222 for storage, for example in match storage 229 for subsequent use in any of the applications described below.

In one implementation for very large scale matching of probe videos against reference videos, the total number of probes are divided into smaller groups for processing against the total number of reference videos for easier handling. For example, a list of 400 million probe videos can be divided into groups of approximately 10 million videos each. Alternatively or additionally, the total number of reference videos can be divided into smaller groups for processing against the total number of probe videos. However, in one embodiment, dividing probe videos into groups is used rather than dividing reference videos into groups because there is an overhead cost to compare one probe against any number of references. The overhead cost is related to retrieving further probe fingerprint information from storage. Thus, dividing the probes into groups results in a lower processing cost than dividing the references into groups that must be compared against each probe (which incurs the overhead cost to compare each probe against each group separately, resulting in a higher total overhead cost).

3. Incremental Matching

Once an initial full collection match has been completed, for example, by following the method 400 described with reference to FIG. 4, it becomes important to periodically update the recognized matches as additional probe videos and reference videos are added to the collection. The process of updating the matches as new probe videos and reference videos are added is reference to herein as incremental matching. FIG. 5A and FIG. 5B illustrate two options for dividing the tasks of matching probe videos and reference videos into batches for incremental matching. FIG. 5C is a series of frames illustrating how a collection of probe videos and reference videos can grow incrementally by scanning batches of the new probe videos against the old reference videos and matching all (new and old) probe videos against all new reference videos.

FIGS. 5A and 5B illustrate options for batching probe videos and reference videos to process matches. The vertical extent of FIGS. 5A and 5B represents the probe videos including a comparatively small number of new probe videos compared to the existing previously matched probe videos. The horizontal extent represents the reference videos, including a comparatively small number of new reference videos compared to the existing previously matched reference videos. Rectangle 551 illustrates the body of pairwise comparisons between the old probes and old references that was completed as part of the previous full collection matching. Referring to FIG. 5A, rectangle 552 represents a batch of all new probes compared against all old references, and rectangle 553 represents a batch of all probes (old and new) compared against all new references. As another option illustrated in FIG. 5B, rectangle 554 represents a batch of all new probes compared against all references (old and new), and rectangle 555 represents all old probes matched against all new references. Note that the combined pairwise comparisons between rectangles 551, 552, and 553 of FIG. 5A is the same as the pairwise comparisons between rectangles 551, 554, and 555 of FIG. 5B.

FIG. 5C illustrates how incremental matching through batches can be used to build up a collection of probe videos and reference videos over time, without repetitive comparisons. As new probe videos are added to the vertical extent of the rectangle and new references are added to the horizontal extent of the rectangle and the additional batches are compared, the combined results represent the new baseline to which further new probe videos and new reference videos can be added. As a result, rectangle 551 representing the collection of probe videos that have been compared against all reference videos grows over time.

Figure 6:
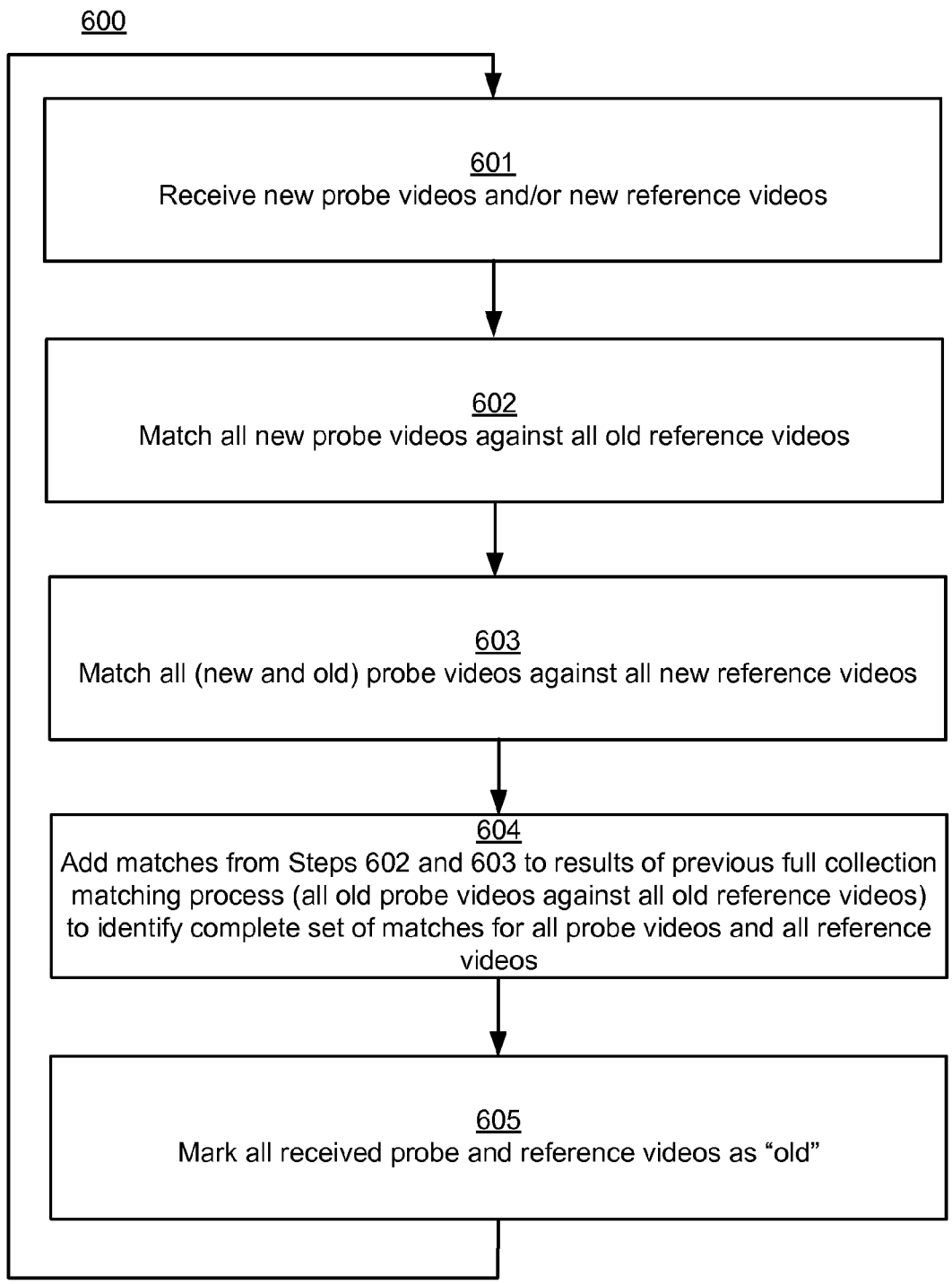
FIG. 6 is an example method of performing incremental matching according to one embodiment.

FIG. 6 is an example method 600 of performing incremental matching after an initial full collection matching process has been completed, according to one embodiment. By performing the method 600 iteratively, the collection of probe videos and reference videos is built up over time, without incurring the costs of comparing a probe video to a reference video more than once.

In 601, new probe videos and/or new reference videos are received by the video sharing website. As described above, the new probe videos and new reference videos are pre-processed to determine LSH bands corresponding to each portion of the video, and the LSH bands may be stored, for example in fingerprint and video ID storage 220 along with the LSH bands from the old probe videos and old reference videos that were already compared in the full collection matching process.

In 602, all new probe videos are matched against all old reference videos. This batch corresponds to rectangle 552 of FIG. 5A. In one embodiment, the matching is completed in the same way as described above with reference to the method 400 of FIG. 4 for completing the full collection matching.

In 603, all (new and old) probe videos are matched against all new reference videos. This batch corresponds to rectangle 553 of FIG. 5A. In one embodiment, this matching also is completed in the same way as described above with reference to the method 400 of FIG. 4.

In 604, the matches from steps 602 and 603 are added to the results of the previous full collection matching process (i.e., matches from all old probe videos against all old reference videos corresponding to rectangle 551 of FIG. 5A) to identify the complete set of matches for all probe videos against all reference videos. Optionally, the matches from the full collection matching and steps 602 and 603 can be outputted to storage for subsequent use in any of the applications described below.

In 605, all received probe and reference videos from 601 are marked as old because all probe videos have been compared against all reference videos, and the work need not be repeated. Instead, on the next iteration of the method 600, the matches from steps 602 and 603 are added to the results of the previous iteration of the method 600 in order to build up over time the collection of probe videos and reference videos that have been compared against each other.

4. Applications for Large Scale Matching of Audio and Video

Many applications exist for systems, methods, and computer-program products for large scale matching of audio and video described herein. Specifically, the matches of probe videos against a set of reference videos can be used to improve search results, identify similar content, and identify duplicates or near duplicates of content for rights holders, among others.

In one application, the matches between probe videos and reference videos can be used to improve search results on a video sharing website. For example, partial or full duplicates of videos can be removed from search results to enable a user to more quickly find desired videos. In a related application, by understanding which videos constitute matches to a popular video, the video sharing website may return the highest quality video among the matches to the popular video (as judged, for example, by the longest length of the video) when a popular video is requested.

In another application, the matches between a probe video and reference videos can be used to suggest similar content to a user who selects or views the probe video. For example, the credits portion of videos may remain the same across various episodes of the videos by the same creator, regardless of who uploads the videos to the video sharing website. Thus, the matches to one episode that a user has enjoyed can lead the user to other episodes. Similarly, a user who has viewed one video with an audio track can be presented with options suggesting other different videos that have a matching audio track.

In another application, the most popular new probe videos are prioritized for matching against new and existing reference videos. For example, the top 10% of new probe videos as measured by number of times they have been viewed are prioritized to be matched first against all new and existing reference videos. This reduces the time required to complete the match process for videos that are being frequently accessed.

In another application, the information regarding which probe videos match reference videos can be used to share metadata among the matching videos. By sharing metadata among matching videos, less effort needs to be expended to manually label or propagate labels across matching videos. Additionally, sharing metadata across matches can also be used to improve search and recommendation capabilities of the video sharing website.

In another application, the information regarding which probe videos match a reference video can be used to identify duplicates or near duplicates of content for rights holders in the reference video. As a result, the rights holders can determine whether the matching probe videos are acceptable or if additional follow-up actions are desired.

5. Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method of performing large-scale matching of a set of probe videos to a set of reference videos, the method comprising:
   accessing locality sensitive hashing (LSH) bands of the set of probe videos, each LSH band of the set of probe videos having a band value and corresponding to a portion of a subfingerprint of a respective probe video of the set of probe videos;
   sorting the LSH bands of the set of probe videos into a first sorted list based on the band values of the LSH bands of the set of probe videos;
   accessing LSH bands of the set of reference videos, each LSH band of the set of reference videos having a band value and corresponding to a portion of a subfingerprint of a respective reference video of the set of reference videos;
   sorting the LSH bands of the set of reference videos into a second sorted list based on the band values of the LSH bands of the set of reference videos;
   linearly scanning the first and second sorted lists of LSH bands for matches; and
   outputting the matches for storage.

2. The method of claim 1, wherein accessing LSH bands of the set of probe videos and accessing LSH bands of the set of reference videos comprise retrieving the LSH bands of the set of probe videos and the set of reference videos from a storage device.

3. The method of claim 1, wherein each LSH band of the set of probe videos corresponds to audio of a respective probe video of the set of probe videos, and each LSH band of the set of reference videos corresponds to audio of a respective reference video of the set of reference videos, and the matches comprise audio matches between the probe videos and reference videos.

4. The method of claim 1, wherein each LSH band of the set of probe videos corresponds to a visual portion of a respective probe video of the set of probe videos, and each LSH band of the set of reference videos corresponds to a visual portion of a respective reference video of the set of reference videos, and the matches comprise visual matches between the probe videos and reference videos.

5. The method of claim 1, wherein sorting the LSH bands of the set of probe videos and sorting the LSH bands of the set of reference videos are both performed by executing a distributed sorter.

6. The method of claim 1, further comprising:
   receiving new probe videos and new reference videos;
   matching the new probe videos against the set of reference videos; and
   matching all probe videos against the new reference videos, wherein all probe videos comprises the set of probe videos and the new probe videos.

7. The method of claim 1, wherein the matches are used to remove duplicates from search results.

8. The method of claim 1, wherein the matches are used to suggest similar content.

9. The method of claim 1, wherein the set of probe videos comprises approximately the top ten percent of probe videos by popularity.

10. The method of claim 1, further comprising sharing metadata among the matches.

11. The method of claim 1, wherein the matches are used to identify duplicates or near duplicates of reference videos for rights holders in the reference videos.

12. A non-transitory computer-readable storage medium storing computer program instructions executable by a processor for large-scale matching of a set of probe videos to a set of reference videos, the computer program instructions comprising instructions for:
   accessing locality sensitive hashing (LSH) bands of the set of probe videos, each LSH band of the set of probe videos having a band value and corresponding to a portion of a subfingerprint of a respective probe video of the set of probe videos;
   sorting the LSH bands of the set of probe videos into a first sorted list based on the band values of the LSH bands of the set of probe videos;
   accessing LSH bands of the set of reference videos, each LSH band of the set of reference videos having a band value and corresponding to a portion of a subfingerprint of a respective reference video of the set of reference videos;
   sorting the LSH bands of the set of reference videos into a second sorted list based on the band values of the LSH bands of the set of reference videos;
   linearly scanning the first and second sorted lists of LSH bands for matches; and
   outputting the matches for storage.

13. The non-transitory computer-readable storage medium of claim 12, wherein the instructions for accessing LSH bands of the set of probe videos and accessing LSH bands of the set of reference videos comprise instructions for retrieving the LSH bands of the set of probe videos and the set of reference videos from a storage device.

14. The non-transitory computer-readable storage medium of claim 12, wherein each LSH band of the set of probe videos corresponds to audio of a respective probe video of the set of probe videos, and each LSH band of the set of reference videos corresponds to audio of a respective reference video of the set of reference videos, and the matches comprise audio matches between the probe videos and reference videos.

15. The non-transitory computer-readable storage medium of claim 12, wherein each LSH band of the set of probe videos corresponds to a visual portion of a respective probe video of the set of probe videos, and each LSH band of the set of reference videos corresponds to a visual portion of a respective reference video of the set of reference videos, and the matches comprise visual matches between the probe videos and reference videos.

16. The non-transitory computer-readable storage medium of claim 12, wherein the instructions for sorting the LSH bands of the set of probe videos and sorting the LSH bands of the set of reference videos are both instructions for executing a distributed sorter.

17. The non-transitory computer-readable storage medium of claim 12, wherein the instructions further comprise instructions for:
  receiving new probe videos and new reference videos;
  matching the new probe videos against the set of reference videos; and
  matching all probe videos against the new reference videos, wherein all probe videos comprises the set of probe videos and the new probe videos.

18. The non-transitory computer-readable storage medium of claim 12, wherein the matches are used to remove duplicates from search results.

19. The non-transitory computer-readable storage medium of claim 12, wherein the matches are used to suggest similar content.

20. The non-transitory computer-readable storage medium of claim 12, wherein the set of probe videos comprises approximately the top ten percent of probe videos by popularity.

21. The non-transitory computer-readable storage medium of claim 12, wherein the instructions further comprise instructions for sharing metadata among the matches.

22. The non-transitory computer-readable storage medium of claim 12, wherein the matches are used to identify duplicates or near duplicates of reference videos for rights holders in the reference videos.

23. A system for large-scale matching of a set of probe videos to a set of reference videos, the system comprising:
  a storage for locality sensitive hashing (LSH) bands of the set of probe videos, each LSH band of the set of probe videos corresponding to a portion of a subfingerprint of a respective probe video of the set of probe videos, and for LSH bands of the set of reference videos, each LSH band of the set of reference videos having a band value and corresponding to a portion of a subfingerprint of a respective reference video of the set of reference videos;
  a batch manager for accessing the LSH bands of the set of probe videos and the LSH bands of the set of reference videos;
  a sort distributor for sorting the LSH bands of the set of probe videos into a first sorted list based on the band values of the LSH bands of the set of probe videos and for sorting the LSH bands of the set of reference videos into a second sorted list based on the band values of the LSH bands of the set of reference videos;
  a batch matcher for instructing the sort distributor to perform a linear scan of the first and second sorted lists of LSH bands for matches; and
  a pairwise comparison module for determining matches between probe videos and reference videos.

24. The system of claim 23, wherein accessing the LSH bands of the set of probe videos and the LSH bands of the set of reference videos comprises retrieving the LSH bands of the set of probe videos and the set of reference videos from a storage device.

25. The system of claim 23, wherein each LSH band of the set of probe videos corresponds to audio of a respective probe video of the set of probe videos, and each LSH band of the set of reference videos corresponds to audio of a respective reference video of the set of reference videos, and the matches comprise audio matches between the probe videos and reference videos.

26. The system of claim 23, wherein each LSH band of the set of probe videos corresponds to a visual portion of a respective probe video of the set of probe videos, and each LSH band of the set of reference videos corresponds to a visual portion of a respective reference video of the set of reference videos, and the matches comprise visual matches between the probe videos and reference videos.

27. The system of claim 23, wherein the matches are used to remove duplicates from search results.

28. The system of claim 23, wherein the matches are used to suggest similar content.

29. The system of claim 23, wherein the set of probe videos comprises approximately the top ten percent of probe videos by popularity.

30. The system of claim 23, wherein the matches are used to share metadata among the matches.

31. The system of claim 23, wherein the matches are used to identify duplicates or near duplicates of reference videos for rights holders in the reference videos.

* * * * *